United States Patent
Schel et al.

(10) Patent No.: US 9,579,944 B2
(45) Date of Patent: Feb. 28, 2017

(54) SYSTEM AND METHOD FOR ATTACHING A CONTROL ELEMENT OF AN AIR SPRING WITH INTERNAL HEIGHT REGULATING VALVE

(71) Applicant: Tenneco Automotive Operating Company Inc., Lake Forest, IL (US)

(72) Inventors: Jacobus Schel, Eindhoven (NL); Stijn Eeckhoudt, Keerbergen (BE)

(73) Assignee: Tenneco Automotive Operating Company Inc., Lake Forest, IL (US)

( * ) Notice: Subject to any disclaimer, the term of this patent is extended or adjusted under 35 U.S.C. 154(b) by 0 days.

(21) Appl. No.: 14/849,005

(22) Filed: Sep. 9, 2015

(65) Prior Publication Data

US 2016/0089949 A1    Mar. 31, 2016

Related U.S. Application Data

(60) Provisional application No. 62/055,004, filed on Sep. 25, 2014.

(51) Int. Cl.
*B60G 15/14*    (2006.01)
*B60G 17/052*    (2006.01)
(Continued)

(52) U.S. Cl.
CPC ....... *B60G 17/0528* (2013.01); *B60G 17/056* (2013.01); *B60G 17/06* (2013.01);
(Continued)

(58) Field of Classification Search
CPC .. B60G 17/0528; B60G 17/056; B60G 17/06; B60G 17/08; B60G 15/14;
(Continued)

(56) References Cited

U.S. PATENT DOCUMENTS 4,236,074 A * 11/1980 Chen ................ B60G 17/01933
                                            280/6.159
4,310,172 A *  1/1982 Claude ............ B60G 17/01933
                                            280/6.158
(Continued)

FOREIGN PATENT DOCUMENTS

DE    102011082906 A1 *  3/2013    ............ F16F 9/3242
EP        0852188 A2     7/1998
(Continued)

OTHER PUBLICATIONS

International Search Report and Written Opinion dated Dec. 2, 2015 in corresponding PCT Application No. PCT/US2015/049324 (12 pages).

*Primary Examiner* — Laura Freedman
(74) *Attorney, Agent, or Firm* — Harness, Dickey & Pierce, P.L.C.

(57) ABSTRACT

The present disclosure relates to an air spring apparatus for use with a cabin of a vehicle. The apparatus has an upper assembly, a lower assembly, a shock absorber, a bladder, a flexible bumper element and a control element. The shock absorber has a piston rod protruding therefrom and extending through the other one of the upper and lower assemblies. The bladder is attached to the upper and lower assemblies. The flexible bumper element is secured to the piston rod adjacent one of the upper and lower assemblies, and secured to the other one of the upper and lower assemblies. The control element is secured to the flexible bumper element at a first end, and to a valve at a second end, and controls operation of the valve. The flexible bumper element can flex in response to torsional or tilting forces experienced by the one of the upper and lower assemblies, to thus help to limit these forces from being imparted to the control element.

20 Claims, 3 Drawing Sheets

(51) Int. Cl.
*B60G 17/056* (2006.01)
*B60G 17/06* (2006.01)

(52) U.S. Cl.
CPC .. *B60G 2202/152* (2013.01); *B60G 2204/111* (2013.01); *B60G 2204/162* (2013.01); *B60G 2500/30* (2013.01); *B60G 2800/0124* (2013.01)

(58) Field of Classification Search
CPC ........ B60G 2202/152; B60G 2202/242; B60G 2202/314; B60G 2204/111; B60G 2204/162; B60G 2500/30; B60G 2800/0124
See application file for complete search history.

(56) References Cited

U.S. PATENT DOCUMENTS

| | | | |
|---|---|---|---|
| 4,778,156 A * | 10/1988 | Imaizumi | B60G 15/12 267/64.21 |
| 4,805,886 A | 2/1989 | Hassan | |
| 5,129,634 A | 7/1992 | Harris | |
| 5,649,692 A * | 7/1997 | Gilsdorf | B60G 11/26 267/64.21 |
| 5,678,808 A * | 10/1997 | Claude | B60G 15/14 188/269 |
| 6,361,027 B1 * | 3/2002 | Lun | F16F 9/58 267/122 |
| 6,843,472 B2 * | 1/2005 | Henry, III | B60G 13/006 267/64.24 |
| 6,923,433 B2 | 8/2005 | Gross et al. | |
| 7,150,450 B2 * | 12/2006 | Bell | B60G 11/27 267/64.21 |
| 2005/0029062 A1 * | 2/2005 | Dean | B60G 15/068 188/322.12 |
| 2006/0208404 A1 | 9/2006 | Cmich et al. | |
| 2006/0237884 A1 * | 10/2006 | Bell | B60G 11/27 267/64.16 |
| 2011/0266727 A1 | 11/2011 | Knevels | |
| 2013/0234377 A1 * | 9/2013 | Leonard | B60G 15/00 267/219 |
| 2015/0217617 A1 * | 8/2015 | Leonard | B60G 11/62 280/124.16 |
| 2015/0273968 A1 * | 10/2015 | DeBruler | F16F 13/002 267/64.24 |
| 2015/0367700 A1 * | 12/2015 | Allen | B60G 11/62 280/124.16 |

FOREIGN PATENT DOCUMENTS

| | | | | |
|---|---|---|---|---|
| EP | 1327538 A2 | 7/2003 | | |
| IT | WO 2015114536 A1 * | 8/2015 | ............ | F16F 9/535 |
| WO | 2011117125 A1 | 9/2011 | | |

* cited by examiner

SYSTEM AND METHOD FOR ATTACHING A CONTROL ELEMENT OF AN AIR SPRING WITH INTERNAL HEIGHT REGULATING VALVE

CROSS-REFERENCE TO RELATED APPLICATIONS

This application claims the benefit of U.S. provisional patent application Ser. No. 62/055,004 filed Sep. 25, 2014. The entire disclosure of the above application is incorporated herein by reference.

FIELD

The present disclosure relates to air suspension units used in regulating a height of a cabin of a motor vehicle such as a truck, and more particularly to an air suspension unit having a subsystem mounted internally to the air suspension unit which enables an internal valve to be opened and closed as needed, based on a relative change in position between upper and lower assemblies of the air suspension unit, and without being affected by tilting or torsional movements of the upper assembly relative to the lower assembly.

BACKGROUND

The statements in this section merely provide background information related to the present disclosure and may not constitute prior art.

Truck cabins are often suspended with air spring shock absorber units. As the load in the cabin can vary, and in order to maintain a constant height of the cabin, a mechanical pneumatic valve adds pressure to, or releases pressure from, the air suspension unit. The valve regulates pressure in the air spring unit and thus maintains the truck cabin at a generally constant level, regardless of the load within the cabin.

Typical air spring shock absorbers have included upper and lower assemblies, with a shock absorber-like component coupled between the two assemblies. Typically, a flexible bladder-like member encloses the shock absorber like element within an enclosed area. The upper assembly is typically coupled to the cabin, and the lower assembly is coupled to a frame portion of the vehicle. The air spring unit thus supports the cabin above the frame portion of the vehicle in a manner that permits the height of the cabin to be adjusted, depending on the load in the cabin. During operation of the vehicle, at least some small degree of tilting or torsional movement of the upper assembly relative to the lower assembly can be experienced.

In general, with traditional air spring shock absorber units, the valve that is used to control the height of the cabin has typically been located remotely from the air spring shock absorber unit. However, more recently, mechanisms have become available to integrate the valve into the internal construction of the air spring shock absorber. A major challenge to overcome with such an internally mounted valve is the mechanism which is needed to physically actuate the internally mounted valve. More specifically, the challenge is with integrating the component which physically actuates the valve into the interior area of the shock absorber unit. This has proved quite difficult for a number of reasons. For one, the actuating member has to be able move generally linearly with the upper assembly as the upper assembly moves towards and away from the lower assembly. This is needed so that the internal valve's opening and closing is directly linked to the cabin height. However, when attaching the actuating member directly to the upper assembly, the actuating member itself now becomes subject to the tilting and torsional movements of the upper assembly, relative to the lower assembly, as the cabin moves about while the vehicle is in motion. The tilting and torsional movements of the cabin, however, are problematic if the actuating member is directly tied to the upper assembly (which is directly supporting the cabin) as these movements can cause repeated bending and twisting of the actuating member. Accordingly, the significant challenge has been how to integrate the actuating member into the interior area of an air spring shock absorber so that it is able to sense the vertical movement of the upper assembly relative to the lower assembly, without being significantly affected by the tilting and torsional movements of the upper assembly relative to the lower assembly.

SUMMARY

In one aspect the present disclosure relates to an air spring apparatus for use with a cabin of a vehicle. The air spring apparatus may include an upper assembly, a lower assembly, a shock absorber, a bladder, a flexible bumper element and a control element. The shock absorber is disposed adjacent one of the upper and lower assemblies and has a piston rod protruding therefrom and extending through the other one of the upper and lower assemblies. The bladder is attached to the upper and lower assemblies. The flexible bumper element is secured to the piston rod adjacent one of the upper and lower assemblies, and secured to the other one of the upper and lower assemblies. The control element is operably secured to the flexible bumper element at a first end, and movable slidably relative to a valve at a second end, for controlling opening and closing of the valve depending on a spacing between the upper and lower assemblies. The flexible bumper element is able to flex in response to at least one of torsional and tilting forces experienced by the one of the upper and lower assemblies adjacent to the flexible element, to thus limit the at least one of torsional and tilting forces experienced by the at least one of the upper and lower assemblies.

In another aspect the present disclosure relates to an air spring apparatus for use with a cabin of a vehicle. The apparatus may include an upper assembly configured to be securable to a portion of the cabin of the vehicle. A lower assembly may be included which is configured to be securable to a portion of the vehicle such that the air spring apparatus is interposed between the cabin and the vehicle. A shock absorber is disposed adjacent the lower assembly and has a piston rod protruding therefrom. The piston rod extends through the upper assembly and has a distal portion thereof secured to a portion of the cabin. A bladder is attached to the upper and lower assemblies. A flexible bumper element is secured to the piston rod adjacent the upper assembly. A control element is operably secured to the flexible bumper element at a first end, and movable slidably relative to a valve at a second end, for controlling opening and closing of the valve depending on a changing spacing between the upper and lower assemblies in response to a changing load in the cabin. The flexible bumper element is able to flex in response to at least one of torsional and tilting forces experienced by the upper assembly, to thus limit the at least one of torsional and tilting forces experienced by the upper assembly, in response to movement of the cabin of the vehicle, from being imparted to the control element.

In another aspect the present disclosure relates to an air spring apparatus for use with a cabin of a vehicle. The apparatus may include an upper assembly configured to be securable to a portion of the cabin of the vehicle, and a lower assembly configured to be securable to a frame portion of the vehicle. In this manner the air spring apparatus is interposed between the cabin and the frame of the vehicle. A shock absorber is disposed adjacent the lower assembly and has a piston rod protruding therefrom, the piston rod extending through the upper assembly and having a distal portion thereof secured to a portion of the cabin. A bladder is attached to the upper and lower assemblies. A flexible bumper element is secured to the piston rod adjacent the upper assembly. An elongated control element is operably secured to the flexible bumper element at a first end thereof, and movable slidably relative to a valve at a second end thereof. The elongated control element is thus configured for linear movement to control opening and closing of the valve depending on a changing spacing between the upper and lower assemblies in response to a changing load in the cabin. An attachment component is disposed on the flexible bumper element for securing the first end of the elongated control element to the flexible bumper element. The bladder encloses the shock absorber, the elongated control element and the attachment component within an interior area of the bladder while permitting linear movement of the upper and lower assemblies relative to one another in accordance with operation of the shock absorber. The flexible bumper element is able to flex in response to at least one of torsional and tilting forces experienced by the upper assembly, to thus limit the at least one of torsional and tilting forces experienced by the upper assembly, in response to movement of the cabin of the vehicle, from being imparted to the elongated control element.

Further areas of applicability will become apparent from the description provided herein. It should be understood that the description and specific examples are intended for purposes of illustration only and are not intended to limit the scope of the present disclosure.

BRIEF DESCRIPTION OF THE DRAWINGS

The drawings described herein are for illustration purposes only and are not intended to limit the scope of the present disclosure in any way.

DETAILED DESCRIPTION

Figure 1:
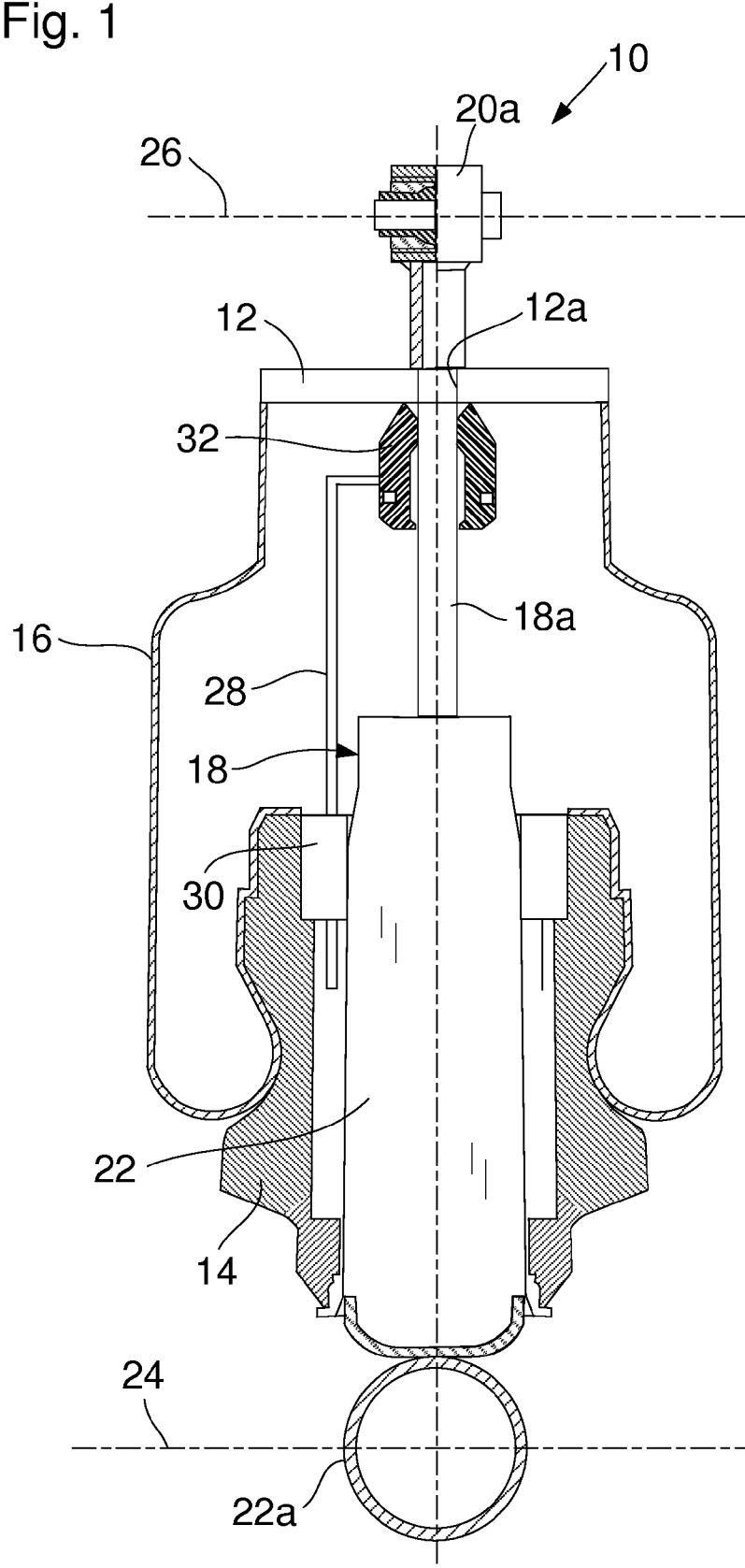
FIG. 1 is a high level, side schematic view of an air spring shock absorber in accordance with one embodiment of the present disclosure.

The following description is merely exemplary in nature and is not intended to limit the present disclosure, application, or uses. It should be understood that throughout the drawings, corresponding reference numerals indicate like or corresponding parts and features.

Referring to FIG. 1, there is shown a schematic view of an apparatus in the form of an air spring shock absorber unit 10 in accordance with one embodiment of the present disclosure (hereinafter simply "air spring unit" 10). The air spring unit 10 may include an upper assembly 12, a lower assembly 14, a flexible bladder 16, and a shock absorber 18 mounted within the bladder 16. The shock absorber 18 has a piston rod 18a and a housing 22. Shock absorbers of this type are well known and therefore no detailed explanation will be provided for the inner workings of the shock absorber 18 itself.

The housing 22 of the shock absorber 18 is coupled at one end to the lower assembly 14. A rod 18a of the shock absorber 18 extends slidably through an opening 12a in the upper assembly 12. The lower assembly 14 is effectively coupled to a frame portion 24 of a vehicle, with the vehicle typically being a truck, once a mounting portion 22a of the housing 22 is secured to the frame portion 24. The upper assembly 12 is effectively coupled to a portion of a cabin 26 of the vehicle through a coupling structure 20a associated with the piston rod 18a. The piston rod 18a is able to move linearly into and out from the housing 22 of the shock absorber 18 in accordance with oscillating motion of the cabin 26, and thus helps to dampen oscillating up and down motion of the cabin of the vehicle.

The air spring unit 10 further includes a control element 28, in this example a rigid rod, which is operably coupled to a valve 30 at one end and at its opposite end to a somewhat flexible bumper element 32. The control element 28 thus extends generally parallel to the piston rod 18a. The bumper element 32 may be formed from rubber, elastomer or any other material that imparts a degree of flexibility and compressibility to the element. The bumper element 32 is secured to the piston rod 18a adjacent the upper assembly 12, for example by adhesives or a press fit, or by any other suitable means. The bumper element 32 is therefore able to flex and twist slightly as the upper assembly 12 experiences tilting and torsional forces imparted by movement of the cabin 26 of the vehicle during operation of the vehicle. The bumper element 32 thus helps to prevent these tilting and torsional forces from being imparted to the control element 28 without otherwise affecting free linear movement of the control element 28.

Figure 2:
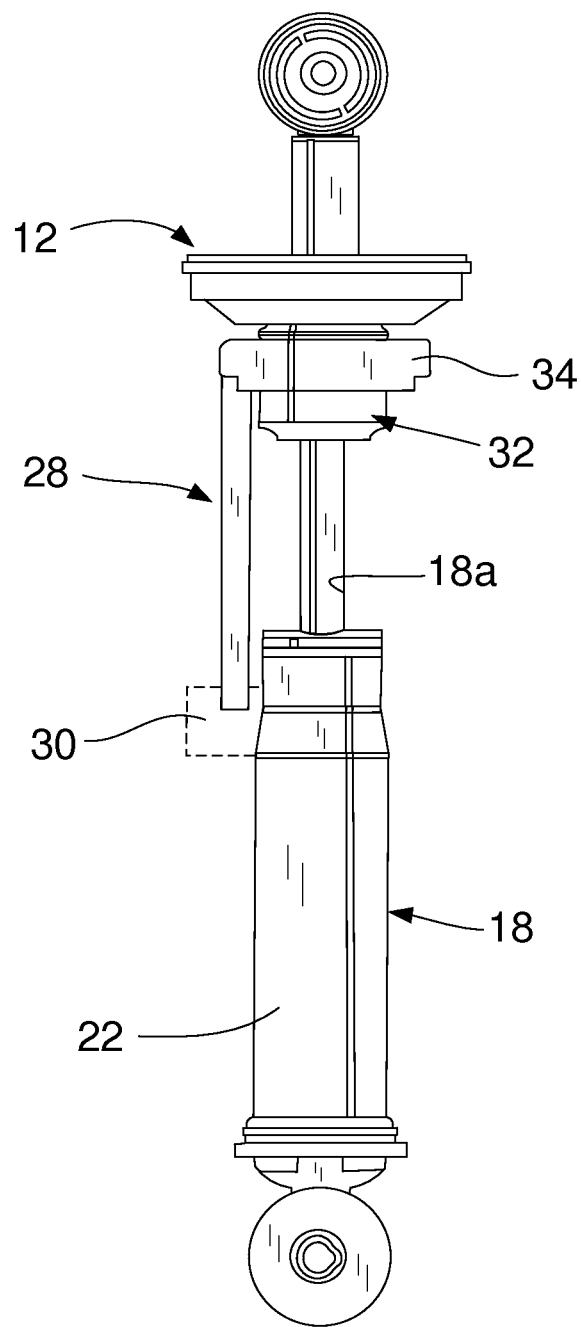
FIG. 2 is a is side elevation view of just a shock absorber and an air spring shock absorber unit.
Figure 3:
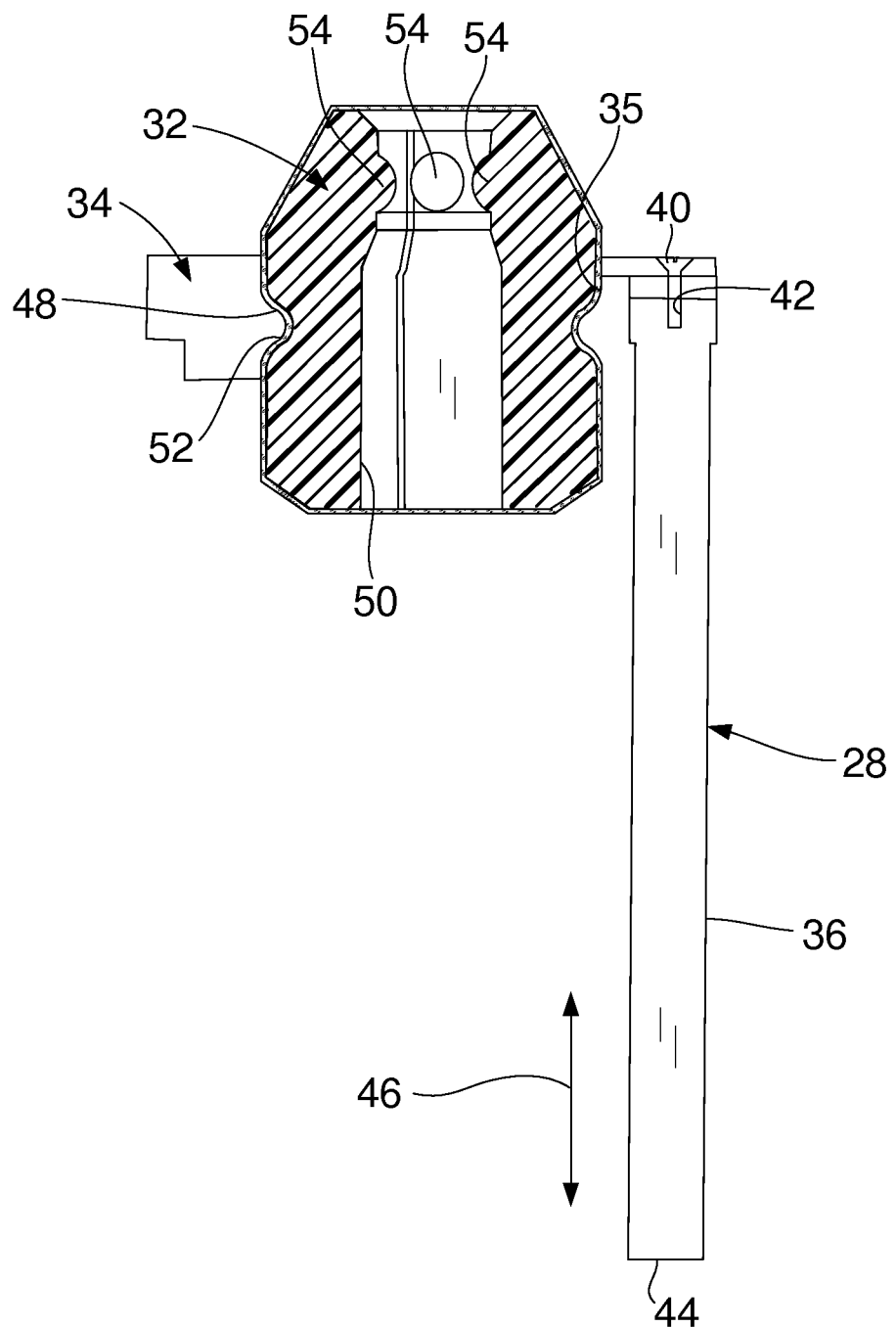
FIG. 3 is a schematic block diagram showing the components of the shock absorber of FIG. 2 in block diagram form coupled to an upper assembly and a lower assembly of the unit.

FIG. 2 shows the air spring unit 10 without the flexible bladder 16, and FIG. 3 shows an enlarged, simplified cross sectional view of the bumper element 32 and a portion of the control element 28 attached thereto. The control element 28 may include an attachment component 34 having a bore 35 configured to receive the bumper element 32 therethrough. The attachment component 34 secures a rod 36 of the control element 28 to the bumper element 32 in a non-removable manner. A threaded screw 40 inserted into a threaded bore 42 of the attachment component 34 is used to make the attachment of the control element 28 to the attachment component 34 in this embodiment. However, it will be appreciated that any other suitable attachment arrangement may be used. A distal portion 44 of the rod 36 is movable slidably relative to the valve 30 (the valve 30 being visible in FIG. 1). In this manner, movement of the control element 28 linearly along the axis defined by arrow 46 controls the valve 30 to either admit air into the interior area of the bladder 16 or to exhaust air within the bladder 16 to atmosphere, depending on the spacing between the upper assembly 12 and the lower assembly 14.

In this example the bumper element 32 has a circumferential channel 48 formed on its outer surface and a bore 50 which extends axially therethrough. The bore 50 receives a portion of the piston rod 18a. The circumferential channel 48 receives a radially inwardly extending portion 52 of the attachment component 34, which secures the attachment component thereto with a friction fit. Again, any other suitable means of attachment may be used. A plurality of circumferentially spaced, radially inward projections 54 help to hold the bumper element 32 on the piston rod 18a in a press fit like manner.

It is a significant feature of the air spring unit 10 that the flexible and compressible nature of the bumper element 32 accommodates a degree of tilting and torsional forces of the upper assembly 12 without imparting such forces to the control element 28, or only imparting a dramatically reduced percentage of such forces. In either event, the control element 28 is able to move generally along a linear path even when tilting and torsional forces are being experienced by the upper assembly 12. This ensures that proper linear movement of the control element 28 will be maintained regardless of external tilting and torsional forces being experienced by the air spring unit 10.

It will be appreciated, however, that while the air spring unit 10 has been described in connection with the cabin of a truck, the air spring unit is not limited to use only with trucks. Any vehicle having a passenger cabin supported thereon, and which is subject to an oscillating motion relative to the vehicle's frame, may potentially make use of the air spring unit 10. Accordingly large vehicles such as those used in commercial farming, which are driven by individuals, as well as large excavation and earth moving equipment, tracked snow grooming vehicles, etc., just to name a few other types of vehicles, may also potentially benefit from the features of the air spring unit 10.

The air spring unit 10 of the present disclosure thus overcomes a significant limitation with prior designs which have attempted to locate a control element inside of a bladder of the unit. The features of the air spring unit 10 as described herein do not add significantly to the overall cost of the air spring unit, do not significantly increase the overall weight of the air sprint unit, nor significantly increase its manufacturing complexity or complexity of assembly.

While various embodiments have been described, those skilled in the art will recognize modifications or variations which might be made without departing from the present disclosure. The examples illustrate the various embodiments and are not intended to limit the present disclosure. Therefore, the description and claims should be interpreted liberally with only such limitation as is necessary in view of the pertinent prior art.

What is claimed is:

1. An air spring apparatus for use with a cabin of a vehicle, including:
   an upper assembly operably associated with the cabin;
   a lower assembly operably associated with the vehicle;
   a shock absorber disposed adjacent one of the upper and lower assemblies, the shock absorber having a piston rod protruding therefrom and extending through the other one of the upper and lower assemblies;
   a bladder attached to the upper and lower assemblies;
   a flexible bumper element secured to the piston rod adjacent one of the upper and lower assemblies, and secured to the other one of the upper and lower assemblies;
   a control element operably secured to the flexible bumper element at a first end, and to a valve at a second end, for controlling opening and closing of the valve depending on a spacing between the upper and lower assemblies; and
   the flexible bumper element being able to flex in response to at least one of torsional and tilting forces experienced by the one of the upper and lower assemblies adjacent to the flexible bumper element, to thus limit transmission of the at least one of torsional and tilting forces to the control element.

2. The air spring apparatus of claim 1, further comprising an attachment component for securing the control element to the flexible bumper element.

3. The air spring apparatus of claim 2, wherein:
   the flexible bumper element includes a circumferential channel; and
   the attachment component includes a circumferential projection projecting radially inwardly, which engages with the circumferential channel of the flexible bumper element to secure the flexible bumper element thereto with a friction fit.

4. The air spring apparatus of claim 1, wherein the piston rod includes a coupling structure at a distal end thereof for securing to a portion of the cabin.

5. The air spring apparatus of claim 1, wherein the shock absorber includes a mounting portion for securing to a portion of the vehicle.

6. The air spring apparatus of claim 1, wherein the control element comprises a rigid rod disposed generally parallel to the piston rod.

7. The air spring apparatus of claim 1, wherein the flexible bumper element is comprised of elastomer.

8. An air spring apparatus for use with a cabin of a vehicle, including:
   an upper assembly configured to be securable to a portion of the cabin of the vehicle;
   a lower assembly configured to be securable to a portion of the vehicle, such that the air spring apparatus is interposed between the cabin and the vehicle;
   a shock absorber disposed adjacent the lower assembly and having a piston rod protruding therefrom, the piston rod extending through the upper assembly and having a distal portion thereof secured to a portion of the cabin;
   a bladder attached to the upper and lower assemblies;
   a flexible bumper element secured to the piston rod adjacent the upper assembly;
   a control element operably secured to the flexible bumper element at a first end, and to a valve at a second end, for controlling opening and closing of the valve depending on a changing spacing between the upper and lower assemblies in response to a changing load in the cabin; and
   the flexible bumper element being able to flex in response to at least one of torsional and tilting forces experienced by the upper assembly, to thus limit the at least one of torsional and tilting forces experienced by the upper assembly, in response to movement of the cabin of the vehicle, from being imparted to the control element.

9. The air spring apparatus of claim 8, further comprising an attachment component configured to be secured to the flexible bumper element, for securing the first end of the control element thereto such that the control element is able to extend generally parallel to the piston rod.

10. The air spring apparatus of claim 9, wherein the attachment component includes a bore for receiving the flexible bumper element.

11. The air spring apparatus of claim 9, wherein the attachment component includes a radially inwardly extending portion, and the flexible bumper element includes a circumferential channel on an outer surface thereof which is configured to engage with the radially inwardly extending portion, so that the attachment component is held with a friction fit attachment to the flexible bumper element.

12. The air spring apparatus of claim 9, wherein the control element is secured via a threaded member at the first end thereof to the attachment component.

13. The air spring apparatus of claim 8, wherein the flexible bumper element is comprised of an elastomer.

14. The air spring apparatus of claim 8, wherein the flexible bumper element is configured to be press fit onto the piston rod.

15. The air spring apparatus of claim 8, wherein the control element comprises a generally rigid, elongated rod.

16. An air spring apparatus for use with a cabin of a vehicle, including:
- an upper assembly configured to be securable to a portion of the cabin of the vehicle;
- a lower assembly configured to be securable to a frame portion of the vehicle, such that the air spring apparatus is interposed between the cabin and the frame portion of the vehicle;
- a shock absorber disposed adjacent the lower assembly and having a piston rod protruding therefrom, the piston rod extending through the upper assembly and having a distal portion thereof secured to a portion of the cabin;
- a bladder attached to the upper and lower assemblies;
- a flexible bumper element secured to the piston rod adjacent the upper assembly;
- an elongated control element operably secured to the flexible bumper element at a first end thereof, and to a valve at a second end thereof, and configured for linear movement to control opening and closing of the valve depending on a changing spacing between the upper and lower assemblies in response to a changing load in the cabin;
- an attachment component disposed on the flexible bumper element for securing the first end of the elongated control element to the flexible bumper element;
- the bladder enclosing the shock absorber, the elongated control element and the attachment component within an interior area of the bladder while permitting linear movement of the upper and lower assemblies relative to one another in accordance with operation of the shock absorber; and
- the flexible bumper element being able to flex in response to at least one of torsional and tilting forces experienced by the upper assembly, to thus limit the at least one of torsional and tilting forces experienced by the upper assembly, in response to movement of the cabin of the vehicle, from being imparted to the elongated control element.

17. The air spring apparatus of claim 16, wherein the flexible bumper element is comprised of an elastomer.

18. The air spring apparatus of claim 16, wherein the flexible bumper element includes a bore and is press fit onto the piston rod at a location adjacent the upper assembly.

19. The air spring apparatus of claim 18, wherein the attachment component includes a bore and is press fit onto the flexible bumper element.

20. The air spring apparatus of claim 19, wherein the elongated control element is secured at the first end thereof with a threaded screw to a portion of the attachment component, such that the elongated control element extends generally parallel to the piston rod.

* * * * *